(12) United States Patent
Woo (10) Patent No.: US 8,165,798 B2
(45) Date of Patent: Apr. 24, 2012

(54) SYSTEM FOR EVALUATING POI AND METHOD THEREOF

(75) Inventor: Keun Sang Woo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 637 days.

(21) Appl. No.: 12/340,876

(22) Filed: Dec. 22, 2008

(65) Prior Publication Data

US 2010/0057351 A1    Mar. 4, 2010

(30) Foreign Application Priority Data

Aug. 26, 2008 (KR) .................. 10-2008-0083401

(51) Int. Cl.
*G01C 21/00* (2006.01)
(52) U.S. Cl. ...................................... 701/400
(58) Field of Classification Search .................. 701/207, 701/213, 400
See application file for complete search history.

(56) References Cited

U.S. PATENT DOCUMENTS

2008/0076451 A1*    3/2008    Sheha et al. ............... 455/456.3

FOREIGN PATENT DOCUMENTS

| JP | 2004-239727 | | 8/2004 |
|---|---|---|---|
| JP | 2005-030980 | | 2/2005 |
| JP | 2006-178228 | A | 7/2006 |
| JP | 2007-193391 | A | 8/2007 |
| JP | 2007-334505 | A | 12/2007 |
| JP | 2008-058101 | | 3/2008 |
| KR | 10-2001-0102890 | | 11/2001 |
| KR | 10-0474710 | B1 | 3/2005 |
| KR | 10-2007-0097312 | | 10/2007 |

OTHER PUBLICATIONS

Adaptive trajectory segmentation method and its application in in-car navigation system, Phuyal, Bishnu Prasad; The Ohio State University, 2001 , 96 pages; http://proquest.umi.com/podweb?did=728123241&sid=3&Fmt=2&clientId=19649&RQT=309&VName=PQD.*

* cited by examiner

*Primary Examiner* — Mila Airapetian
(74) *Attorney, Agent, or Firm* — Edwards Wildman Palmer LLP; Peter F. Corless (57) ABSTRACT

The present invention relates to a system for evaluating a point of interest (POI) and a method thereof. The system includes a vehicle information center that stores position information of a POI, and a POI evaluation unit for determining whether a user uses the POI or not by using the POI position information, and sends an evaluation result to the vehicle information center after receiving an evaluation of the POI from the user.

9 Claims, 7 Drawing Sheets

Fig.3b thanks for evaluation
now sending evaluation result and
receiving existing evaluation result.
please wait a moment

Fig.3c

Fig.3d congratulation your inputted the same opinion as the majority so we will send you a 30 % discount ticket of " ## ginseng chicken soup" to your registered mobile phone.

confirm  change phone number

Fig.3e

SYSTEM FOR EVALUATING POI AND METHOD THEREOF

CROSS-REFERENCE TO RELATED APPLICATION

This application claims under 35 U.S.C. §119(a) the benefit of Korean Patent Application No. 10-2008-0083401 filed Aug. 26, 2008, the entire contents of which are incorporated herein by reference.

BACKGROUND

The present invention relates to a system for evaluating a point of interest (POI) and a method thereof, more particularly, a system for evaluating a POI in which information about evaluation of POI is received from users and the received evaluation information is sent to a vehicle information center so as to provide users with more accurate evaluation information for the POI, and a method thereof.

A navigation system equipped with a vehicle indicates a current position of the vehicle and a moving direction to guide a person to a destination through a display screen by using coordinates received from a GPS (global positioning system) satellite. In other words, the navigation system indicates a moving path, an estimated time, and a distance when places of departure and destination are inputted, thereby allowing the driver of the vehicle to arrive quickly and safely at a destination that may be unfamiliar to the driver.

In addition, the navigation system provides various additional functions including a POI service, real time traffic information, information for life, a radio broadcasting signal, and a vehicle robbery alarm.

In particular, the POI service is a very convenient service since it separately stores information about positions of, for example, government offices, restaurants, department stores, and grocery stores that people frequently use and can guide users to such a destination even when the users input only the name of the destination (such as a building name) without inputting the address of the destination.

However, the conventional POI service does not provide much of user-specific information. For instance, while the POI service can provide information about the position of a restaurant, it does not provide information such as preference or satisfaction for the restaurant.

The above information disclosed in this the Background section is only for enhancement of understanding of the background of the invention and therefore, it may contain information that does not form the prior art that is already known in this country to a person of ordinary skill in the art.

SUMMARY

According to an aspect of the present invention, a system for evaluating a POI includes: a vehicle information center that stores position information of a POI; and a POI evaluation unit for determining whether a user uses the POI or not by using the POI position information, and sends an evaluation result to the vehicle information center after receiving an evaluation of the POI from the user.

Another aspect of the present invention provides a method for evaluating a POI, which comprises: determining whether a user uses a POI or not by using position information of the POI received from a vehicle information center; receiving an evaluation of the POI from the user, when it is determined that the user uses the POI; sending a received evaluation result to the vehicle information center; and storing the evaluation result at the vehicle information center and updating the POI position information.

According to the present invention, exact evaluation information for a POI can be provided to users, thereby enhancing users convenience and satisfaction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features and advantages of the present invention will be apparent from or are set forth in more detail in the accompanying drawings, which are incorporated in and from a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 1:
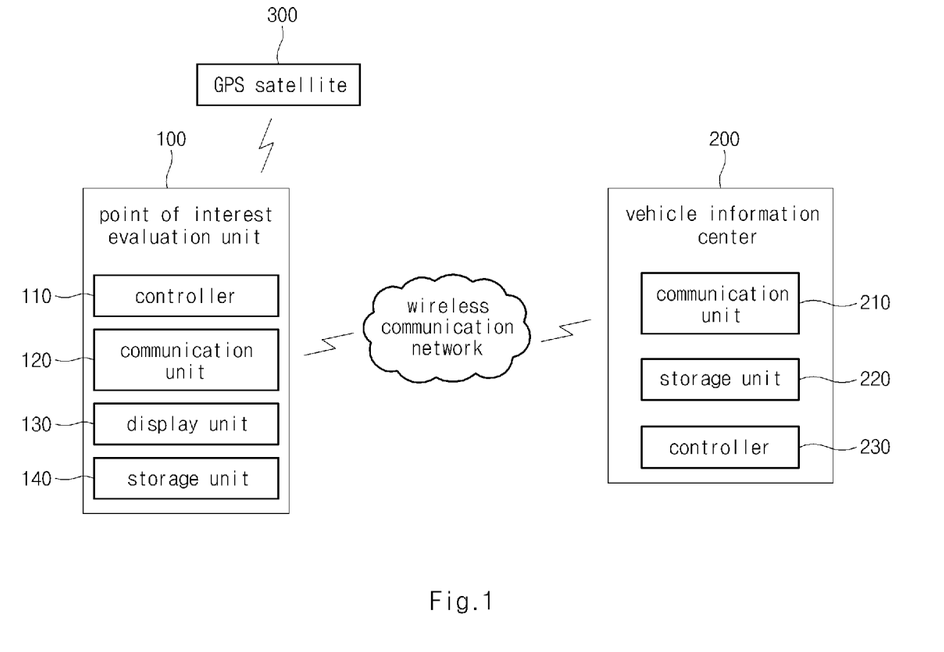
FIG. 1 is a configuration diagram of a POI evaluation system according to an embodiment of the present invention.

FIG. 1 is a configuration diagram of a POI evaluation system according to an embodiment of the present invention.

The POI evaluation system includes a POI evaluation unit 100 and a vehicle information center 200.

The POI evaluation unit 100 may determine whether the vehicle of a user is currently parked around a POI by using a POI position information received from the vehicle information center 200. When the vehicle is parked around the POI, the POI evaluation unit 100 receives the evaluation of the POI from the user and sends a corresponding evaluation result to the vehicle information center 200. In this case, the POI may be any place that may interest the user. For example, the POT may be a service providing establishment, including, e.g., restaurants, beauty salons, and Internet cafes, government and public offices, department store, and grocery stores.

The POI evaluation unit 100 includes a controller 110, a communication unit 120, a display unit 130, and a storage unit 140.

The controller 110 checks whether the vehicle is at a POI. In the case when the vehicle is at a POI, the controller 110 checks whether an evaluation of the POI or rejection of such an evaluation has been made. if neither the evaluation nor the rejection has been made, the controller 110 checks whether the vehicle is parked around the POI over a predetermined time In this case, the controller 110 can check whether the vehicle is parked around the POI over a predetermined time in various ways. For example, it can calculate the arrival time and the departure time on the basis of position information of the vehicle received from a GPS satellite 300. Also, for example, it can calculate the time difference between ignition-off and ignition-on.

Figure 3A:
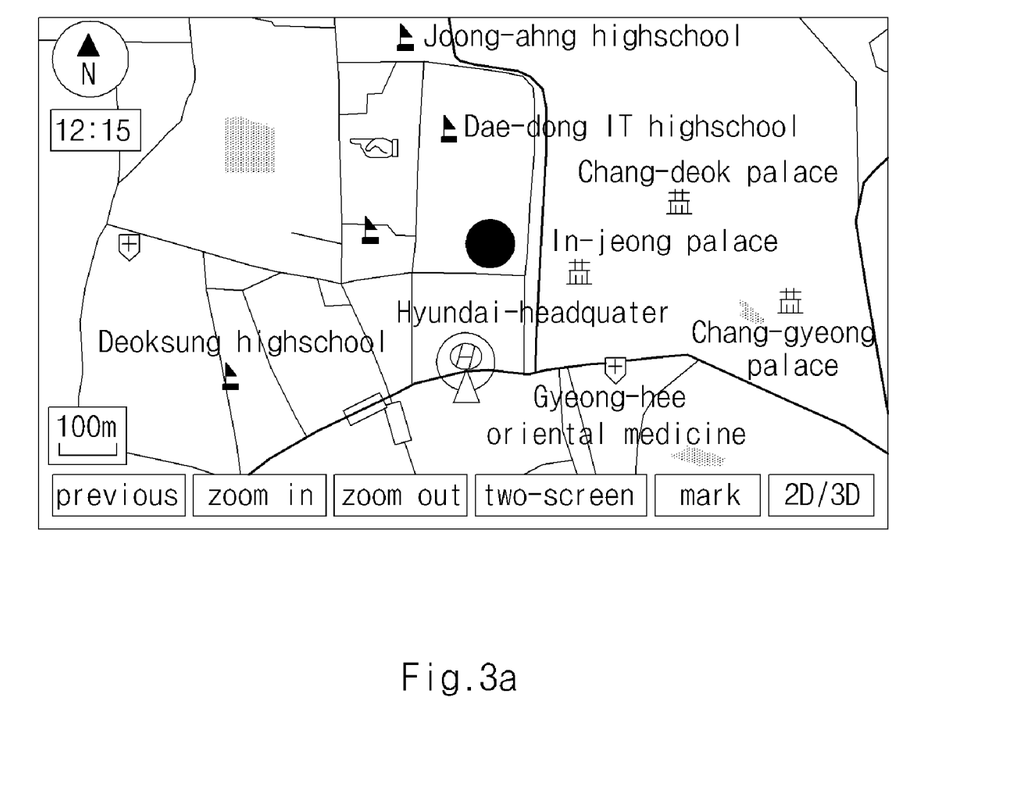
FIGS. 3*a* to 3*e* show examples of screens displayed with regard to the evaluation of the POI of of FIG. 2.
Figure 3B:
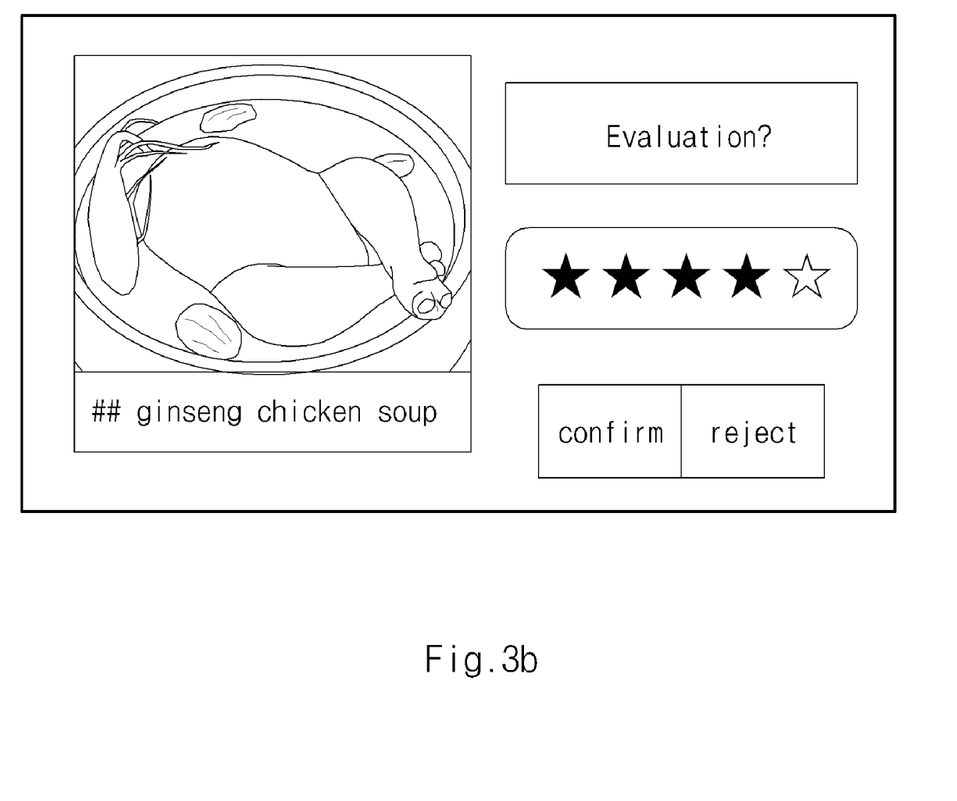

If the vehicle is parked around the POI over a predetermined time, the controller 110 turns the display unit 130 on and controls the display unit 130 to indicate an evaluation screen (e.g., FIG. 3B). Moreover, the controller 110 receives an evaluation result from the user and sends the evaluation result to the vehicle information center 200.

The communication unit 120 performs wireless communication with the vehicle information center 200 through a wireless communication network.

Figure 3C:
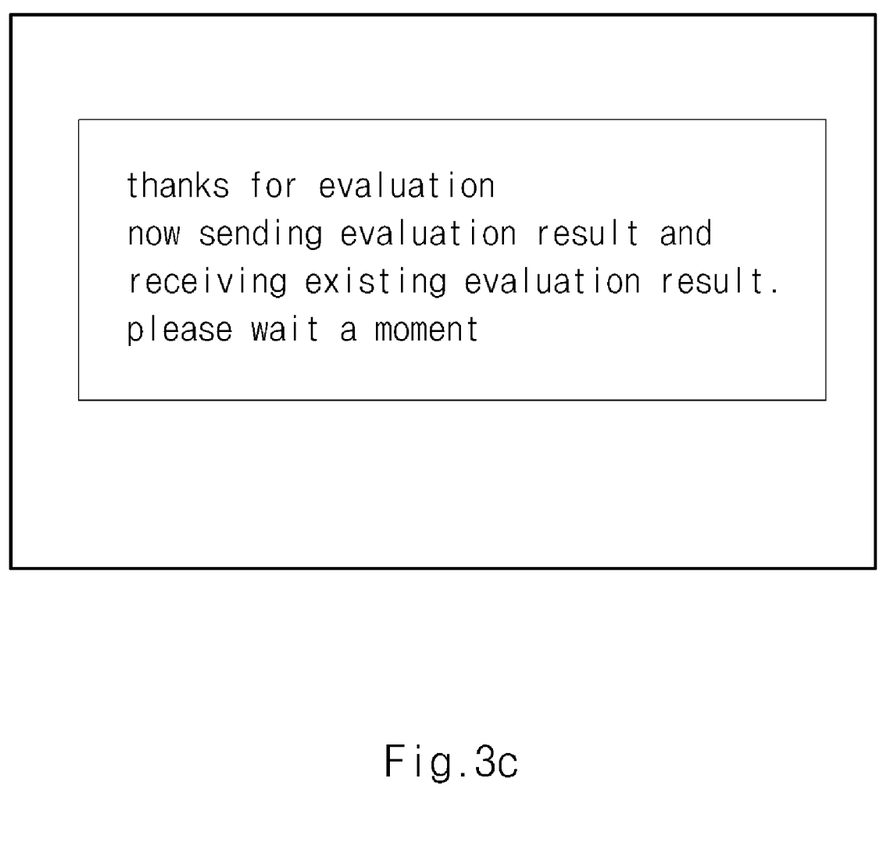
Figure 3D:
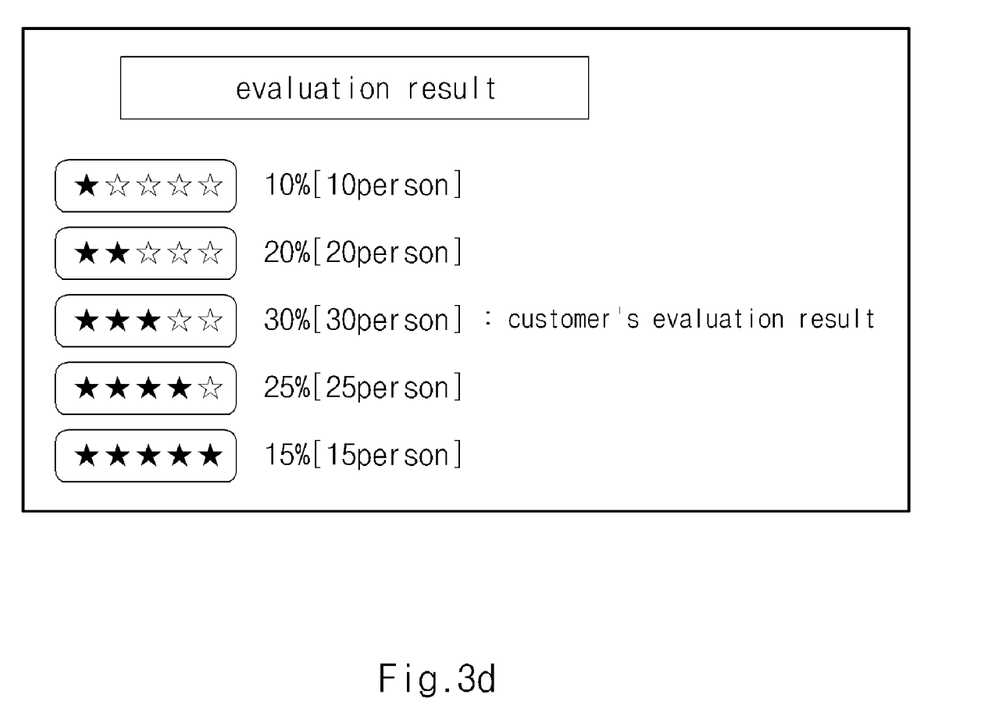
Figure 3E:
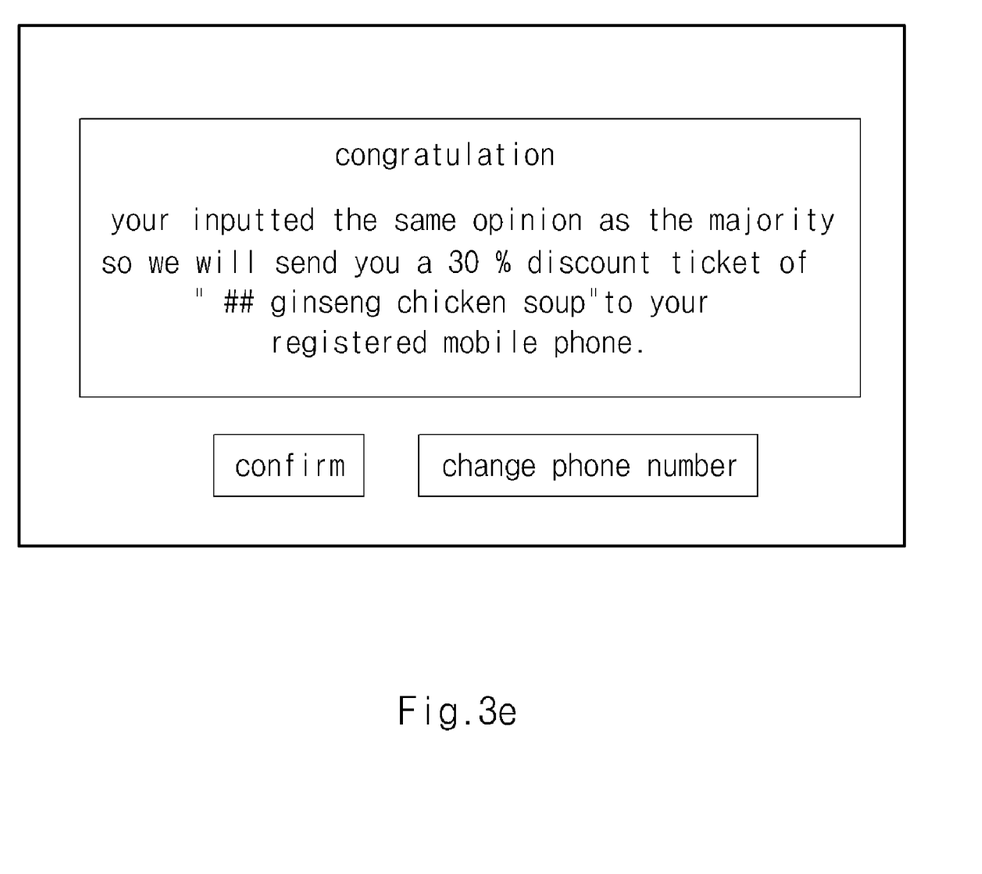

The display unit 130 displays a screen containing information of the position of the POI as illustrated in FIG. 3A, an evaluation screen for the POI as illustrated in FIG. 3B, a post-evaluation as illustrated in FIG. 3C, an evaluation screen as illustrated in FIG. 3D, and a screen indicating delivery of discounted ticket or coupon as illustrated in FIG. 3E.

The storage unit 140 contains the POI position information received from the vehicle information center 200, the result of the existing evaluation or the result of the rejection of evaluation, the vehicle information including the vehicle arrival time and the starting time, and graphic screen information as shown in FIG. 3B to FIG. 3E.

The POI evaluation unit 100 can be a telematics terminal, a multimedia terminal such as AVN (audio, video, navigation) device, or a mobile terminal.

The vehicle information center 200 provides a POI position information to the POI evaluation unit 100 and receives the POI evaluation result from the POI evaluation unit 100 to store. It may delete the information of an establishment from the POI position information if the evaluation result is under a preset score.

The vehicle information center 200 includes a communication unit 210, a storage unit 220, and a controller 230.

The communication unit 210 performs wireless communication with the POI evaluation unit 100 through a wireless communication network.

The storage unit 220 may store, e.g., the POI position information, the evaluation score for each POI, and a list of recommended POIs. In this case, the recommended POI is a POI the evaluation score of which is higher than a preset score among the POIs used by a predetermined number of people for a predetermined time.

The controller 230 stores in the storage unit 220 the evaluation result of the POI received from the POI evaluation unit 100, and modifies the POI position information according to the evaluation result. In more detail, the controller 230 combines the result of the users evaluation for a corresponding POI. If the combined evaluation result is under a preset score, the controller 230 may delete the information of the corresponding POI or generate a list of unrecommended POI including the corresponding POI to notify users.

On the other hand, if the combined result is higher than a preset score, the controller 230 may add the corresponding POI to the recommended POI list.

When a POI selected by a user is a recommended POI, the controller 230 may indicate on the display unit or informs a user with a voice that the selected POI is a recommended POI.

As described, the vehicle information center 200 generates a recommended establishment list and an unrecommended POI list through the result of users preference evaluation, and deletes the information of an unrecommended POI or POIs included in the unrecommended POI list from the POI position information.

The vehicle information center 200 may provide the recommended POI list and the unrecommended POI list to a user if requested by a user.

Further, the vehicle information center 200 can inform a user of specific information, by making a database of popular establishments of similar types of business that the user uses frequently after analyzing the use tendency of the user through the evaluation results.

Figure 2:
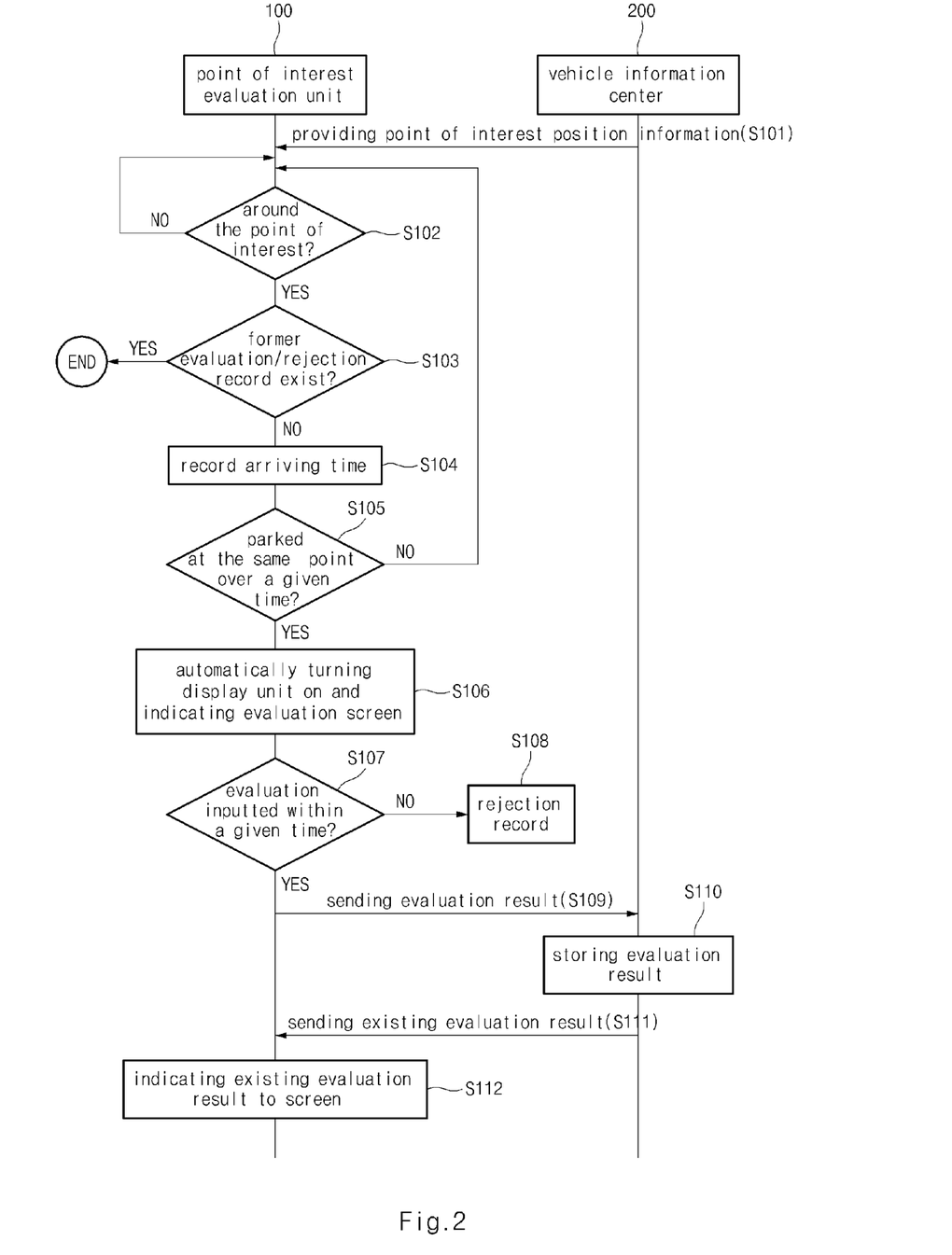
FIG. 2 is a flowchart showing the method of evaluating a POI according to an embodiment of the present invention.

Hereinafter, a method for evaluating a POI of the invention will be described in detail with reference to FIG. 2.

Firstly, the POI evaluation unit 100 receives position information of a POI from the vehicle information center 200, and stores it into the storage unit 140. The POI evaluation unit 100 indicates the POI position information on the display unit 130 as shown FIG. 3A, and then determines whether the vehicle is around the POI (S102). In this case, the POI evaluation unit 100 may communicate with the GPS satellite 300.

If the vehicle is around the POI, the controller 110 of the POI evaluation unit 100 determines that the vehicle arrives at the POI and checks whether evaluation of the POI or rejection of such evaluation has been made (S103).

If neither the evaluation nor the rejection has been made, the controller 110 of the POI evaluation unit 100 records the arrival time (S104), and determines whether the vehicle is parked around the POI over a predetermined time (S105).

If the vehicle is parked around the POI over a predetermined time, the controller 110 of the POI evaluation unit 100 turns the display unit 130 on so that the display unit 130 indicates the evaluation screen, as shown in FIG. 3B, for receiving the evaluation of the POI (S106).

The controller 110 of the POI evaluation unit 100 determines whether evaluation of the POI or rejection thereof is inputted by a user within a predetermined time (S107). In this case, the determination can be made in various ways. For example, the determination can be made by providing a confirmation menu or a rejection menu as shown in FIG. 3B to enable a user to choose. Also, for example, it can be determined that an evaluation is rejected when the evaluation is not inputted within a predetermined time.

If the rejection is made at the step S107, the controller 110 of the POI evaluation unit 100 stores the rejection into the storage 140 (S108).

On the other hand, if the evaluation is made at the step S107, the communication unit 120 of the POI evaluation unit 100 sends the evaluation result to the vehicle information center 200 (S109) and the vehicle information center 200 stores the evaluation result into storage unit (220) (S110).

Then, the vehicle information center 200 sends the evaluation result of other users for a corresponding POI to the POI evaluation unit 100 (S111).

Accordingly, the display unit 130 of the POI evaluation unit 100 indicates the evaluation result of other users to enable a user to check the evaluation result of the other users (S112).

As described, after the results for the POI is checked, the controller 110 of the POI evaluation unit 100 sends a discounted ticket or coupon for the POI to a mobile terminal of the user who evaluated the POI, as shown in FIG. 3E, so that the user can use the ticket or coupon when they go to the corresponding POI.

The POI position information can be updated periodically or at non-regular intervals on the basis of real time evaluation received from a user using a POI. Further, according to the updated evaluation score of the POI, information of the POI can be removed from or added to the POI position information or removed from or added to a recommended list or unrecommended list, thereby enhancing users satisfaction.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A system for evaluating a point of interest (POI), the system comprises:
   a vehicle information center that stores position information of a POI; and
   a POI evaluation unit for determining whether a user uses the POI or not by using the POI position information, and sends an evaluation result to the vehicle information center after receiving an evaluation of the POI from the user,
   wherein the POI evaluation unit determines:
   whether the vehicle exists around the POI and checking whether an evaluation of the POI has been performed or not when the vehicle exists around the POI;
   whether the vehicle is parked around the POI over a predetermined time, when the evaluation of the POI has not been performed; and
   that the vehicle uses the POI when the vehicle is parked around the POI over the predetermined time.

2. The system of claim 1, wherein the vehicle information center stores the evaluation result and deletes information of the POI from the POI position information when a score of the POI resulting from the evaluation result is under a preset score.

3. The system of claim 1, wherein the POI evaluation unit comprises:
   a storage unit for storing the POI position information and evaluation history information of the POI;
   a controller for determining whether the user uses the POI or not by using the POI position information, determining whether an evaluation of the POI has been performed or not by using the evaluation history information, and if the evaluation has not been performed, receiving an evaluation of the POI from the user;
   a communication unit for sending the vehicle information center the evaluation result received from the user and receiving evaluation results of other users of the POI from the vehicle information center; and
   a display unit for displaying the evaluation results of other users of the POI.

4. The system of claim 2, wherein if the vehicle is parked around the POI over a predetermined time, the controller determines that the vehicle uses the POI.

5. The system of claim 2, wherein the controller provides a discounted ticket or coupon for the POI to a mobile terminal of the user when a completed evaluation from the user is received.

6. A method for evaluating a POI, the method comprises:
   determining whether a user uses a POI or not by using position information of the POI received from a vehicle information center;
   receiving an evaluation of the POI from the user, when it is determined that the user uses the POI;
   sending a received evaluation result to the vehicle information center; and
   storing the evaluation result at the vehicle information center and updating the POI position information,
   wherein determining comprises:
   determining whether the vehicle exists around the POI and checking whether an evaluation of the POI has been performed or not when the vehicle exists around the POI:
   determining whether the vehicle is parked around the POI over a predetermined time, when the evaluation of the POI has not been performed; and
   determining that the vehicle uses the POI when the vehicle is parked around the POI over the predetermined time.

7. The method of claim 6, further comprises receiving evaluation results of other users of the POI from the vehicle information center.

8. The method of claim 6, wherein the updating of the POI position information comprises deleting information of the POI from the POI position information when a score resulting from evaluation results from users is under a preset score.

9. The method of claim 6, further comprises providing a discounted ticket or coupon for the POI to a mobile terminal of the user when a completed evaluation from the user is received.

* * * * *